INVENTOR.
Robert W. Engle
BY
ATTORNEY

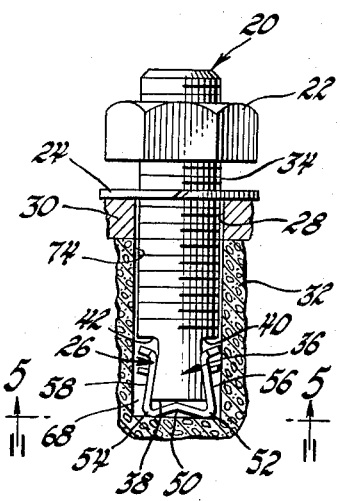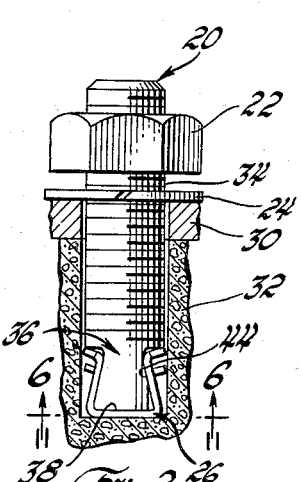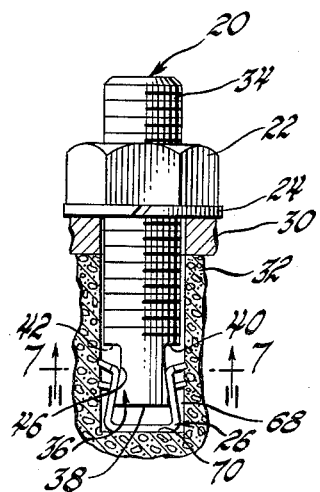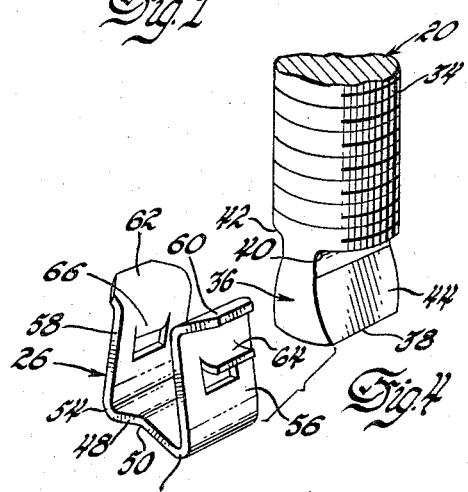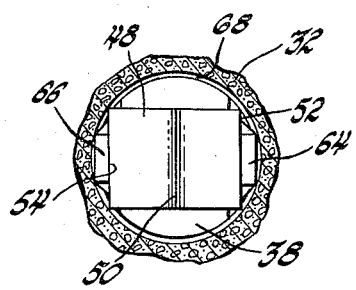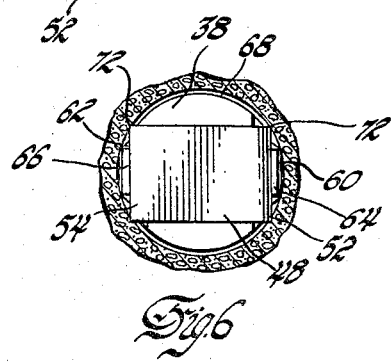
INVENTOR.
Robert W. Engle
BY
ATTORNEY Dec. 26, 1961   R. W. ENGLE   3,014,398
STUD AND ANCHOR ASSEMBLY COMPRISING STUD WITH
WEDGE SHAPED END AND SHEET METAL ANCHOR
Filed June 16, 1958   2 Sheets-Sheet 2

United States Patent Office 3,014,398
Patented Dec. 26, 1961

3,014,398
STUD AND ANCHOR ASSEMBLY COMPRISING STUD WITH WEDGE SHAPED END AND SHEET METAL ANCHOR
Robert W. Engle, Indianapolis, Ind., assignor to General Motors Corporation, Detroit, Mich., a corporation of Delaware
Filed June 16, 1958, Ser. No. 742,347
5 Claims. (Cl. 85—2.4)

The invention relates to an assembly by which articles may be anchored in mortar, brick, concrete, etc. It is more particularly related to a stud and anchor assembly which permits articles such as machinery to be anchored after placing the machinery in the desired position. The assemblies may be installed through stud receiving apertures provided on the machinery to be anchored. Units embodying the invention require relatively shallow anchor holes and provide positive anchorages. Each unit includes an anchor which may be formed of sheet metal and secured to a stud having one end preformed to receive the anchor. The invention requires no lead or other materials to provide a firm anchorage.

In the drawing:

FIGURE 1 is a view of an assembly embodying the invention with parts broken away and in section. The assembly is shown after having been inserted in the anchor hole but prior to being secured in place.

FIGURE 2 shows the assembly of FIGURE 1 after the first step in the securing operation has been performed.

FIGURE 3 shows the assembly of FIGURE 1 in is secured position.

FIGURE 4 is an exploded isometric view of a portion of the stud and anchor assembly of FIGURE 1.

FIGURE 5 is a cross section view taken in the direction of the arrows 5—5 in FIGURE 1.

FIGURE 6 is a cross section taken in the direction of arrows 6—6 of FIGURE 2.

Figure 7:
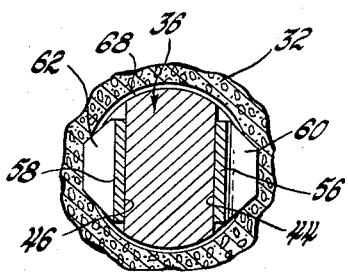
FIGURE 7 is a cross section view taken in the direction of arrows 7—7 of FIGURE 3.

A stud and anchor assembly embodying the invention may be used in various applications for anchoring an article to concrete, brick, etc. Assemblies embodying the invention are illustrated as anchoring a plate to a concrete base. The plate may be the lug of an item such as stationary machinery, for example. The assembly includes a stud 20 having a nut 22, a washer 24, and an anchor 26. The assembly is inserted through an aperture 28 in the plate 30 which is to be anchored to the base 32.

The stud 20 has a threaded section 34 and an end 36 which is not required to be threaded. End 36 terminates in a flat bottom 38. The portion of end 36 intermediate bottom 38 and the threaded section 34 has undercuts 40 and 42 formed on diametrically opposite sides with adjacent surfaces 44 and 46 tapered or flared outwardly to intersect the plane of the stud bottom 38. Thus the lower portion of stud 20 presents a generally trapezoidal or dovetail appearance as seen in FIGURES 1 through 3.

The anchor assembly 26 is preferably formed of sheet metal and includes a centrally located anchor bottom 48 which is bent upwardly at 50. The corners 52 and 54 are formed by bending the sheet metal to provide anchor sides 56 and 58 extending upwardly and inwardly from the anchor bottom 48. The anchor sides terminate in flanges or tongues 60 and 62 which are bent outwardly in generally opposite directions. The intermediate portions of the anchor sides have tongues or tabs 64 and 66 struck outwardly therefrom and extending slightly upward in a direction generally parallel to flanges 60 and 62.

The overall formation of the anchor 26 is complementary to the trapezoidal end of stud 20 and may be slipped over that end, as is clearly seen in the drawings. The anchor sides may be bent inward sufficiently to normally hold the anchor in position on stud 20. When it is placed on the stud end 36, the anchor 26 is completely within the circular formation of the stud end. This permits the entire assembly to be placed in a hole which is only of sufficient diameter to receive the stud 26.

Prior to using the assembly, the plate 30 is located with its aperture 28 in the desired position in which it is to be anchored. A hole 68 is then drilled into the base material with the drilling tool extending through aperture 28. Thus hole 68 will be no larger than aperture 28. The hole need be driven only a short distance in the base material. It has been found that a hole with a depth equivalent to two times the stud diameter is sufficient for most purposes. The hole is preferably drilled to provide a flat bottom 70.

After the hole 68 is drilled, the assembly is inserted through aperture 28 of plate 30 and into hole 68 as is shown in FIGURE 1. If nut 22 is already threaded on stud 20, it is positioned well above plate 30 so that it will not interfere with the securing operation. The upper end of stud 20 is then tapped smartly with a soft hammer so that the bottom 38 of the stud engages the bend 50 of the anchor assembly and flattens the anchor bottom 48 as is shown in FIGURE 2. This operation expands the anchor bottom 48 so that the anchor corners 52 and 54 move away from each other. The ends 72 of the corners are then slightly embedded in the side wall 74 of hole 68. This is best shown in FIGURE 6. Thus the anchor assembly 26 is secured to the base 32 at the bottom of hole 68. While it is not secured sufficiently to anchor the stud in place permanently, it will retain its secured position during the next operation.

Nut 22 is then tightened into position as is shown in FIGURE 3. After the nut initially engages washer 24, subsequent tightening will cause stud 20 to move upwardly. The tapered sides 44 of the dovetail or wedge portion of the stud engage the inner surfaces of anchor sides 56 and 58 and cause them to spread apart. This action results in a biting action of the flanges 60 and 62 and the tongues 64 and 66. These elements are thus embedded into the side wall 74 on diametrically opposite sides and in a position intermediate the bottom 70 of hole 68 and the position assumed by undercuts 40 and 42. As nut 22 is tightened further, the stud will be firmly anchored in place. Since the tapered surfaces 44 of the stud and the cooperating inner surfaces of the anchor sides 56 and 58 are flat, stud 20 will be effectively prevented from rotation during the tightening process.

Figure 8:
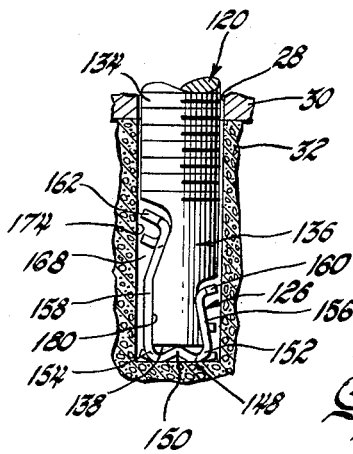
FIGURE 8 is a view of a modified assembly with parts broken away and in section. The assembly is shown in place but prior to being secured.
Figure 9:
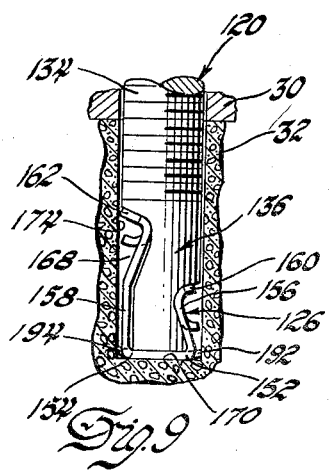
FIGURE 9 shows the assembly of FIGURE 8 after the first step in the securing operation has been performed.
Figure 10:
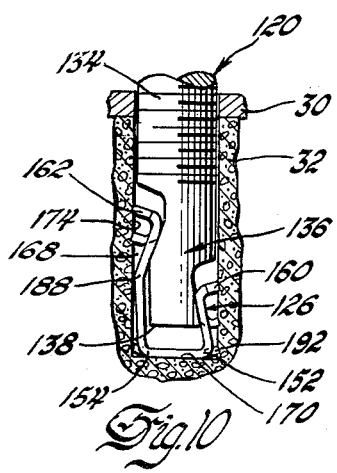
FIGURE 10 shows the assembly of FIGURE 8 secured in place.
Figure 11:
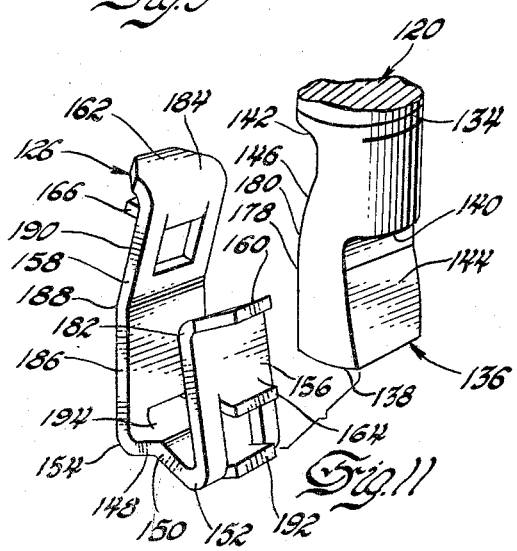
FIGURE 11 is an exploded isometric view of the assembly of FIGURE 8.

In order that a stud may be used with standard torque characteristics for a stud of the diameter being used, it is preferable to form the trapezoidal end 36 of the stud so that the minimum stud cross section area adjacent the undercuts 40 and 42 is greater than the root area of the threaded section 34. The stud and anchor assembly shown in FIGURES 1 through 7 may be used within these limitations on studs of larger sizes. When relatively small studs are used, however, the minimum cross section condition cannot be maintained with this assembly. For such studs it is preferable to use the modification shown in FIGURES 8 through 11.

The modified stud 120 is provided with a modified anchor 126 to anchor plate 30 in position. Stud 120 had a threaded section 134 and an end 136 which is undercut to receive anchor 126 in a manner generally similar to the assembly of FIGURE 1. End 136 is provided with an undercut 140 on one side thereof at a short distance from the stud bottom 138. The tapered surface 144 connects undercut 140 with the stud bottom 138 in a manner similar to surface 44 of the first described assembly.

The portion diammetrically opposite tapered surface 144 is provided with a flat surface 178 which is generally parallel to the stud axis but located radially inward of the cylindrical formation of stud end 136. At a point 180 generally opposite undercut 140, flat surface 178 tapers inwardly to provide tapered surface 146. This surface terminates at a second undercut 142 which is diametrically opposite undercut 140 and longitudinally spaced therefrom along the axis of the stud 120.

Anchor 126 is formed in a manner generally similar to anchor 26 described above but is modified to complement the stud end 136. Anchor 126 may also be formed from a sheet metal strip. It is provided with an anchor bottom 148 which is bent upwardly at 150. The sheet metal is bent at corners 152 and 154 to provide anchor sides 156 and 158. These sides extend upwardly and inwardly from anchor bottom 148 and terminate in flanges or tongues 160 and 162. These flanges are bent outwardly in generally opposite directions. Anchor side 158 is sufficiently longer than anchor side 156 to permit the bent portions 182 and 184 at the roots of flanges 160 and 162 to nest within undercuts 140 and 142, respectively, when the anchor is placed on stud end 136. Anchor side 158 thus has a straight section 186 which extends generally parallel to the anchor central axis and is bent at 188 to provide the inwardly extending portion 190 of the anchor side 158.

The anchor side 156 and the inwardly bent portion 190 of anchor side 158 may have tongues or tabs 164 and 166 struck outwardly therefrom and extending in a direction generally parallel to flanges 160 and 162. The anchor sides may also have tongues or tabs 192 and 194 struck outwardly therefrom adjacent corners 152 and 154 to provide additional anchorage if desired.

Due to the spaced construction of the undercuts 140 and 142, the hole 168 must be drilled in the base material 32 to a somewhat deeper depth than required of the hole 68. It has been found that hole depths on the order of three stud diameters is usually sufficient.

The modified anchor assembly is installed in the same manner as the anchor assembly of FIGURES 1 through 7. When the stud 120 is tapped to flatten bottom 148 to the position shown in FIGURE 9, tongues 192 and 194 are embedded in the side wall 174 of hole 168 immediately adjacnt the hole bottom 170 to initially secure the anchor 126 in place. When the nut is tightened on the stud 120, the stud moves upwardly as before and the tapered surfaces 144 and 146 act as wedge surfaces to cause the anchor sides 156 and 158 to expand radially outward and cause biting engagement of flanges 160 and 162 and tongues 164 and 166 with the hole side wall 174. This action anchors the assembly securely in place.

The modified construction of FIGURES 8 through 11 permits the minimu mcross section area of stud end 136 to remain greater than the root diameter of the stud threaded portion 134 by displacing the undercuts 140 and 142 axially of the stud end. Thus more material may be left on each of the sides of the stud opposite the undercuts to obtain this result.

A stud and anchor assembly has thus been disclosed which may be used in relatively shallow anchor holes. This will result in decreased labor and drill tool costs. The anchor portion of the assembly can be produced less expensively than present devices since it is formed of sheet metal. It will also use considerably less steel and no lead is required as compared to present anchor devices. Stud and anchor assemblies embodying the invention permit the anchor hole to be drilled through the stud holes formed in the articles to be anchored in position without requiring the articles to be set in place, the holes marked, the articles removed, the holes drilled, anchors installed and the article to then be replaced and the stud inserted. Instead, the article to be secured in place is positioned as desired and anchored without the necessity for removal to permit installation of an anchor. No special installation tools are required for the assembly. When it is desired to move the anchored article to anchor position, the stud portion of the assembly may be cut off, leaving a smooth floor since the portion of the stud remaining in place will completely fill the anchor hole.

What is claimed is:

1. A stud and anchor assembly comprising a stud and a sheet metal anchor for said stud, said stud having a threaded section adjacent one end and the other end formed to provide a wedge section, said stud other end having a first undercut on one side and a second undercut on the opposite side therefrom said undercuts providing surfaces which slope downwardly and outwardly from said stud threaded section toward the extreme end of said other stud end, said anchor having a bottom and a pair of sides bent upwardly and inwardly from said bottom and terminating in outwardly extending tongues to provide final anchoring means, said anchor bottom being bent centrally inward and including preliminary anchor fastening means activated by forcing said stud other end downwardly to flatten and spread said bottom laterally, said anchor being received about said stud wedge section and within the circumferential formation of said stud.

2. The assembly of claim 1, said first undercut being diametrically opposite said second undercut and spaced therefrom along the stud axis.

3. The assembly of claim 1, said preliminary fastening means being angularly formed corners of said anchor bottom.

4. The assembly of claim 1, said preliminary fastening means including at least one tab struck from at least one of said anchor sides and extending outwardly to form a continuation of said anchor bottom.

5. The assembly of claim 1, said final anchoring means further including tabs struck outwardly from the planes of said sides intermediate said terminal tongues and said bottom.

References Cited in the file of this patent

UNITED STATES PATENTS

| | | |
|---|---|---|
| 2,753,750 | Dempsey | July 10, 1956 |
| 2,774,273 | Olson | Dec. 18, 1956 |

FOREIGN PATENTS

| | | |
|---|---|---|
| 1,018,678 | France | May 22, 1950 |